Nov. 18, 1930. F. W. PARKHILL 1,782,245
INTERCHANGEABLE APPLIANCE FOR MIXING, BEATING, ETC
Filed Oct. 1, 1929 2 Sheets-Sheet 1

INVENTOR:
F. W. Parkhill.
BY Chas. W. Gerard
ATTORNEY.

Nov. 18, 1930.    F. W. PARKHILL    1,782,245
INTERCHANGEABLE APPLIANCE FOR MIXING, BEATING, ETC
Filed Oct. 1, 1929    2 Sheets-Sheet 2
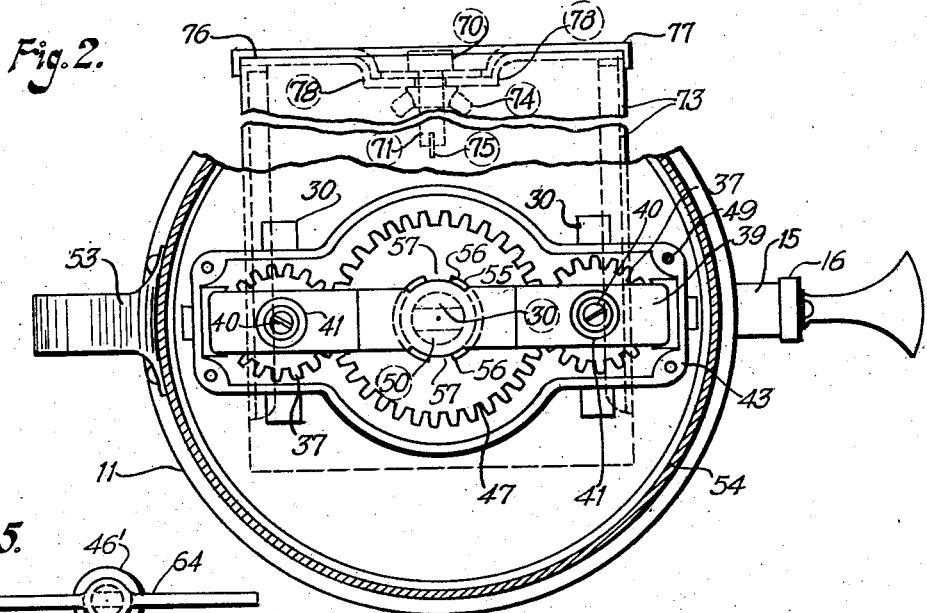
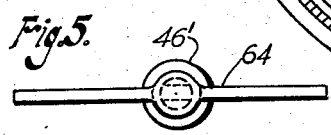
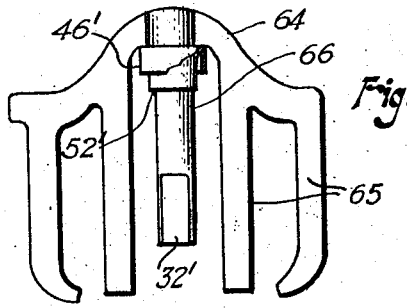
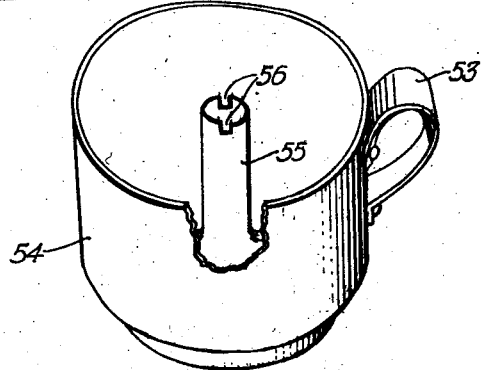
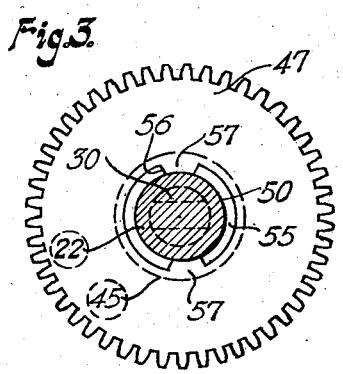
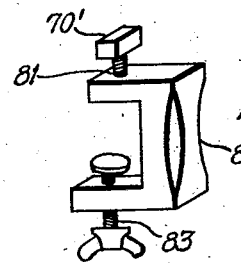
INVENTOR:
F. W. Parkhill.
BY Charles W. Gerard.
ATTORNEY.

Patented Nov. 18, 1930

1,782,245

UNITED STATES PATENT OFFICE

FREDERIC W. PARKHILL, OF KANSAS CITY, MISSOURI

INTERCHANGEABLE APPLIANCE FOR MIXING, BEATING, ETC.

Application filed October 1, 1929. Serial No. 396,487. REISSUED

The present invention relates to kitchen and household appliances for use in the mixing and beating of materials, and other operations, involved in the preparation or baking and cooking of food materials, and the primary object of the invention is to devise a practical and efficient appliance of this character, of durable and inexpensive construction and having instrumentalities of an interchangeable type for adapting the same for various different operating functions.

Accordingly, I have devised an appliance adapted for hand operation, although equally adaptable for motor driven use, and comprising a practical and compactly arranged driving mechanism with which various types of operative attachments may be quickly and conveniently connected for mixing, beating or whipping and the like.

It is also sought to provide an appliance in which the receptacle, provided for containing the materials which are being treated by the device is of removable cup form having a housing for accommodating the various connections while in operative position.

A further object of the invention is to provide an improved stable form of disconnectible drive connection adapted to afford a rigid, and firm connection with smooth and quiet driving action.

A novel and improved beating or whipping attachment is also comprised within the main purpose of the invention.

It is also sought to devise a practical and efficient supporting as well as wall-attaching means for mounting the appliance in position for use.

With the foregoing general objects in view, the invention will now be described by reference to the accompanying drawings, illustrating a compact hand-operated device for household use, embodying the various features of improvement, after which those features and combinations which are deemed to be novel and patentable will be set forth and claimed.

Figure 2 is a plan view with the cover member removed and other parts partially broken away;

Figure 3 is a section on line III—III of Figure 1 on a larger scale;

Figure 4 is a perspective view of the receptacle or cup member;

Figure 1:
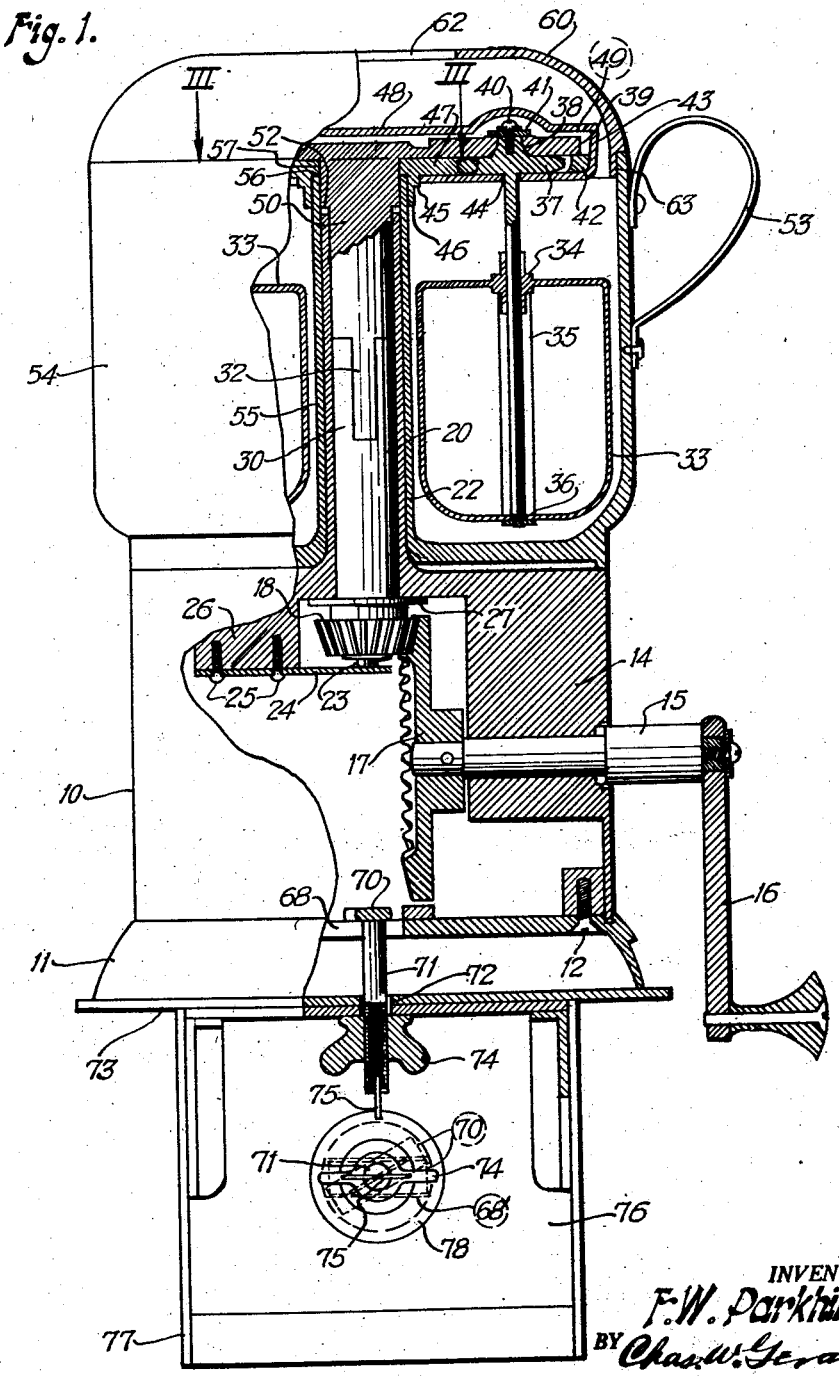
Figure 1 is a front elevation partly in vertical section and partially broken away, illustrating an appliance constructed in accordance with the present invention.

Figures 5 and 6, edge and side views, respectively illustrating a modified form of attachment for mixing or beating operations; and Figure 7 is a perspective view showing the clamping member for securing the device to a table or bench.

Referring now to the said drawings in detail, these illustrate the appliance as comprising a hollow body portion 10, and a base member 11, attached thereto by screws 12. Inside the body is formed a block structure 14 to provide a drive for a horizontal shaft 15 having the exterior operating handle 16. The inner end of the shaft 15 carries a gear wheel 17, meshing with a pinion 18, provided on the lower end of a vertical shaft 20, operating in a sleeve bearing 22, projecting upward from the center of the body 10, as illustrated in Figure 1. The lower end of the shaft 22, has a knob-like extension 23 engaged by a steel spring plate 24, supported by adjusting screws 25, carried by an adjacent block 26, whereby an upward thrust may be imparted to the shaft 20, and this thrust varied for varying the frictional engagement of the collar or flange 27 on said shaft with the inner face of the body 10, or marginal portion surrounding the opening into the sleeve bearing 22. By this means the drive connection may be adjusted and any loose play in the pinion 18 and its shaft 20 eliminated. The upper end of the shaft 20, is bifurcated inside the sleeve 22 as indicated at 30, for making detachable driving connection with the tongue 32, of the particular attachment or material treating device which is to be mounted into position for operation. In Figures 1 and 2 this is illustrated as a cream whipping attachment comprising a pair of whipping elements or frames 33 provided with central sleeves 34, for slidingly engaging the pair of vertical shafts 35, to the lower end of which said frames are detachably threaded as indicated at 36. The upper ends of the shafts 35 are provided with gears 37 having hub portions 38 journaled in the end portions of a bar or plate 39, and retained in connection therewith by screws 40 and washers 41. The ends of the bar 39 rest on spacer blocks 42 mounted in the ends of a housing 43 which is provided with openings 44 for the shaft 35 and also an intermediate opening 45 for the hub flange 46 of a gear wheel 47 resting on the bottom of said housing 43, between the gears 37 and meshing therewith. A cap or cover plate 48 is secured by screws 49 over the top of the housing 43.

The drive connection to this cream whipping device is made by means of a stem 50 projecting down from the middle portion of the bar or plate 29, and formed with the tongue 32 which engages the forked portion 30 of the pinion shaft 20 inside the sleeve 22, the stem having a shoulder 52 adapted to function as a limiting stop by engagement with the upper end of said sleeve; prior to such engagement it will be understood that the spring member 24 provides a yielding support for the shaft 20, and other parts connected therewith, including the elements of the mixing or beating attachment.

The top face of the body 10 forms a flat supporting surface on which to set the receptacle or cup member 54 for embracing the bearing sleeve 22. The upper end of the sleeve 55 enters the annular space between the top of the stem 50 and the flange hub 46 of the gear 47, so that this interfitted relation of the parts provides a firm and substantially rigid bearing structure for the support and drive of the attachment in a quiet smooth manner without any lost motion between the parts. The upper end of the sleeve 55 is also formed with a pair of notches or recesses 56, for engagement with lugs 57 (see Figures 2 and 3) projecting inward from the hub portion of the gear 47, whereby the latter is maintained stationary as required for the operation of the cream whipping device. In this operation, the stem 50 and bar 39 are rotated by the shaft 20, carrying the gears 37 around the fixed gear 47 in planetary fashion, and thereby imparting rapid simultaneous rotating motion to the whipping elements 30 in the same direction about their separate individual shafts 35. The direction of the thread provided at 36 is opposite to the direction of this rotation, to prevent unscrewing of the frames 30 from the shafts 35. The cup 54 is removable as shown in Figure 6, and when mounted in operative position upon the body 10, the handle 53 may be left in either right or left hand position (compare Figures 1 and 2).

For the cup or receptacle a cover member 60 is provided having a central opening 62 of appropriate size, and a marginal flange 63 adapted to set inside the upper edge of the receptacle or cup member 54, as illustrated in Figure 1.

It is apparent that the pinion shaft 20, with its bifurcated end 30, is adaptable for interchangeable use for the driving of different types of attachments, having the same form of stem for connection with said shaft, as for example, the mixing, beating, or stirring device shown in Figures 5 and 6, comprising the frame 64, with fingers 65, and stem 66, adapted for entering the sleeve 22 and formed with the tongue 32' for engagement with the fork 30. The stem 66 is also formed with the shoulder 52' as well as with a flange 46' to provide the annular housing space for embracing the upper end of the cup sleeve 65, as in the cream whipping form of the attachment.

The appliance may be supported without any fastening means, as upon the top of a table or the like, but may also be conveniently supplied with clamping or securing means for attachment to either a horizontal or vertical surface. I have illustrated the base member 11 provided with an oblong opening 68, for entry of a lock bar 70 on the end of a screw 71, fitted through an opening 72 in a horizontal bracket arm or plate 73 and carrying a wing or other form of clamping nut 74. Turning of the bar 70 at an angle to the slot or opening 68 so as to engage the inner face of the base member 11, and then tightening of the nut 74 effects a secure clamping action for holding the appliance in fixed position. An index element may be fitted to the outer end of the screw 71, such as a plate 75, for indicating the position of the bar 70 with reference to the opening 68.

A similar locking contrivance may be provided for attaching the vertical bracket arm 76 to a fixed wall plate 77, the parts 76 and 77 being each formed with a boss 78, and the rear boss cut with an oblong opening 68' for the bar 70, and the other locking parts being practically the same as just described.

For attaching to a table or bench, the bracket device, such as illustrated in Figure 7, may be employed, comprising the U-clamp member 80, one arm of which is provided with a stem 81, carrying the locking bar 79, adapted for insertion through the opening 68, whereby turning of the screw 83 will operate to clamp the base member 11 securely to the top surface of the bench or table.

It will thus be seen that I have devised a very practical, compact and efficient construction for fulfilling the desired objects of my invention. The receptacle or cup member is conveniently removable and replaceable in operating position, and the cup sleeve forms a housing for the drive connections and also coacts with the shaft parts and upper end of the sleeve 22 to produce a firm and substantially rigid bearing structure, insuring a smooth driving action, free from vibration. A yielding support for the drive structure and the attachments connected therewith is also provided by the spring plate 24, which is also adjustable to vary the frictional action produced by engagement of the collar or flange 27 with the adjacent surface of the body member 10. A most effective and speedy cream whipping action is produced by the described beating or whipping appliance, which is, of course, well adapted for the whipping of other materials, such as mayonnaise, French dressing, etc., in the said manner. The interchangeable feature is of decided advantage, allowing the quick and convenient interchange of attachments for other operations, such as the mixing or beating device shown in Figures 5–6 (for mixing materials such as cake batter, etc.) and other attachments of various types which may be provided with the same stem or tongue structure 50—32, for connection with the drive or pinion shaft.

The means provided for securing the appliance in fixed position upon a bracket, table, or wall surface affords a quick acting and secure fastening means for this purpose. It is also apparent that the appliance may be manufactured in any desired size according to requirements, as well as adapted for motor driven use if desired.

While I have illustrated and described what I regard as the preferred and most practical form of construction for embodying the various features of improvement, I desire to be understood as expressly reserving the right to make all changes and modifications which fairly fall within the scope of the appended claims.

What I claim is:

1. A device of the character described comprising a body member, driving means mounted in said member and including an upwardly projecting shaft, a receptacle on the top of said member and having a sleeve or housing enclosing such shaft, and a material treating device mounted in said receptacle with journal bearing support on the top of said sleeve and provided with a detachable drive connection with said shaft.

2. A device of the character described comprising a body member provided with an upwardly projecting sleeve, driving means mounted in said member and including a vertical shaft projecting into said sleeve, a receptacle mounted on said member and having a sleeve or housing enclosing said first sleeve, and material treating means mounted within the receptacle with journal bearing support on the top of the sleeve thereof and provided with a detachable connection with said shaft.

3. A device of the character described comprising a body member provided with an upwardly projecting sleeve bearing, a receptacle mounted on said member and provided with a central sleeve telescoping over said sleeve bearing, and a material treating device mounted within said receptacle and having a journal bearing support on the top of the sleeve thereof, driving means mounted in said body member, and sectional disconnectible shaft elements connecting said driving means and treating device and enclosed by said sleeve bearing.

4. A device of the character described comprising a body member, driving means mounted in said member and including an upwardly projecting and yieldingly supported shaft, a receptacle mounted on said member and having a sleeve enclosing said shaft, and a material treating device mounted in said receptacle and having an operative and supporting relation to the upper end of said shaft.

5. A device of the character described comprising a body member, driving means mounted in said member and including an upwardly projecting shaft, a receptacle mounted on said member and having a sleeve or housing enclosing such shaft, an adjustable spring element in supporting engagement with the lower end of said shaft, and a material treating device mounted in said receptacle and having an operative and supporting relation to the upper end of said shaft.

6. A device of the character described comprising a body member provided with an upwardly projecting sleeve bearing, a receptacle mounted on said member and having a sleeve or housing enclosing said sleeve bearing, driving means in said member and including a vertical shaft projecting into said sleeve bearing and provided with a flange in frictional engagement with the lower end of said bearing, material treating means carried by the upper end of said shaft within said receptacle, and adjustable spring supporting means engaging the lower end of said shaft and adapted to vary the frictional action of said flange.

7. A device of the character described comprising a body member, provided with an upwardly projecting sleeve bearing, a receptacle mounted on said member and provided with a central sleeve telescoping over said sleeve bearing, and a material treating device mounted on said telescoping sleeves and provided with an annular recess in bracing engagement with the upper end of said receptacle sleeve, driving means mounted in said body member, and sectional disconnectible shaft elements connecting said driving means and treating device and enclosed by said sleeve bearing.

8. A kitchen appliance having a body member and a receptacle mounted thereon, said member and receptacle having telescoping sleeves, a beating or whipping device having a plurality of rotating whipping elements carried about the axis of said sleeves and having a journal bearing support on the upper end of the outer of said sleeves, and driving mechanism including a drive connection extending axially through said sleeves.

9. A kitchen appliance having a body member and a receptacle mounted thereon, said member and receptacle having telescoping sleeves, a beating or whipping device comprising a carrying member rotating about the axis of said sleeves and having a journal bearing support on the upper end of the outer sleeve, and a plurality of rotating whipping elements suspended therefrom, and driving mechanism including a drive connection extending axially through said sleeves for rotating said carrying member and driven elements and thereby imparting simultaneous rotary movement to said whipping elements.

10. A kitchen appliance having a body member and a receptacle mounted thereon, said member and receptacle having telescoping sleeves, a beating or whipping device comprising a carrying member rotating about the axis of said sleeves, and a plurality of rotating whipping elements suspended therefrom, and driving mechanism including a drive connection extending axially through said sleeves for rotating said carrying member, and a gear held fixed by the upper end of the receptacle sleeve, said whipping elements having gears in rolling engagement with said fixed gear.

11. A kitchen appliance comprising a superposed body member and receptacle having telescoping bearing sleeves, a beating device comprising a rotating horizontal bar carrying a plurality of rotary whipping elements, and driving mechanism comprising a drive shaft extending axially through said telescoping sleeves for rotating said bar and a gear held fixed by the upper end of the receptacle sleeve, said whipping elements having drive pinions in rolling engagement with the fixed gear and the latter having a flange cooperating with said drive shaft to form an annular recess embracing the upper end of said receptacle sleeve.

In witness whereof I hereunto affix my signature.

FREDERIC W. PARKHILL.